Figure 1:
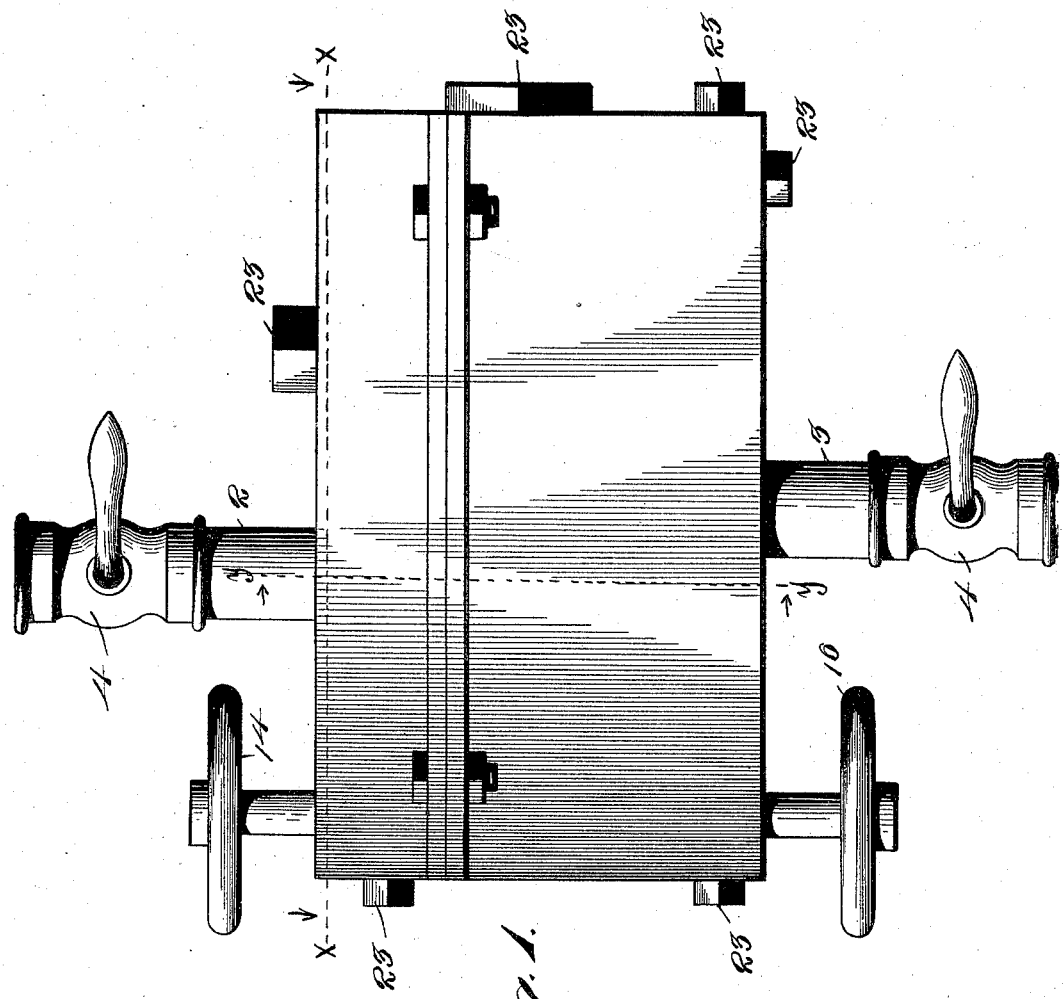
Figure 5:
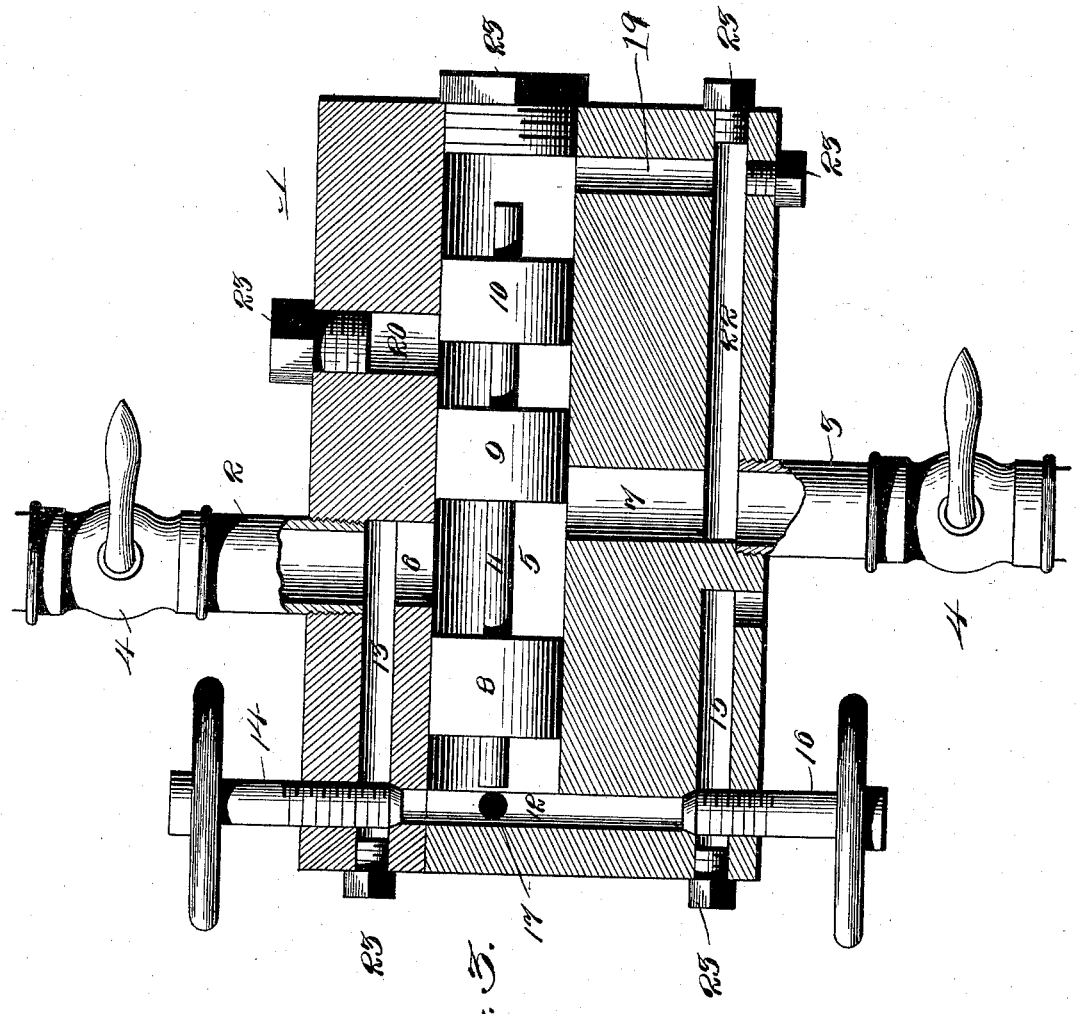

(No Model.)  4 Sheets—Sheet 1.

F. V. BARKER.
FLUID PRESSURE REGULATOR.

No. 584,766.  Patented June 22, 1897.

WITNESSES  INVENTOR
Frederick V. Barker,
by John Wedderburn
Attorney (No Model.) 4 Sheets—Sheet 2.
F. V. BARKER.
FLUID PRESSURE REGULATOR.
No. 584,766. Patented June 22, 1897.
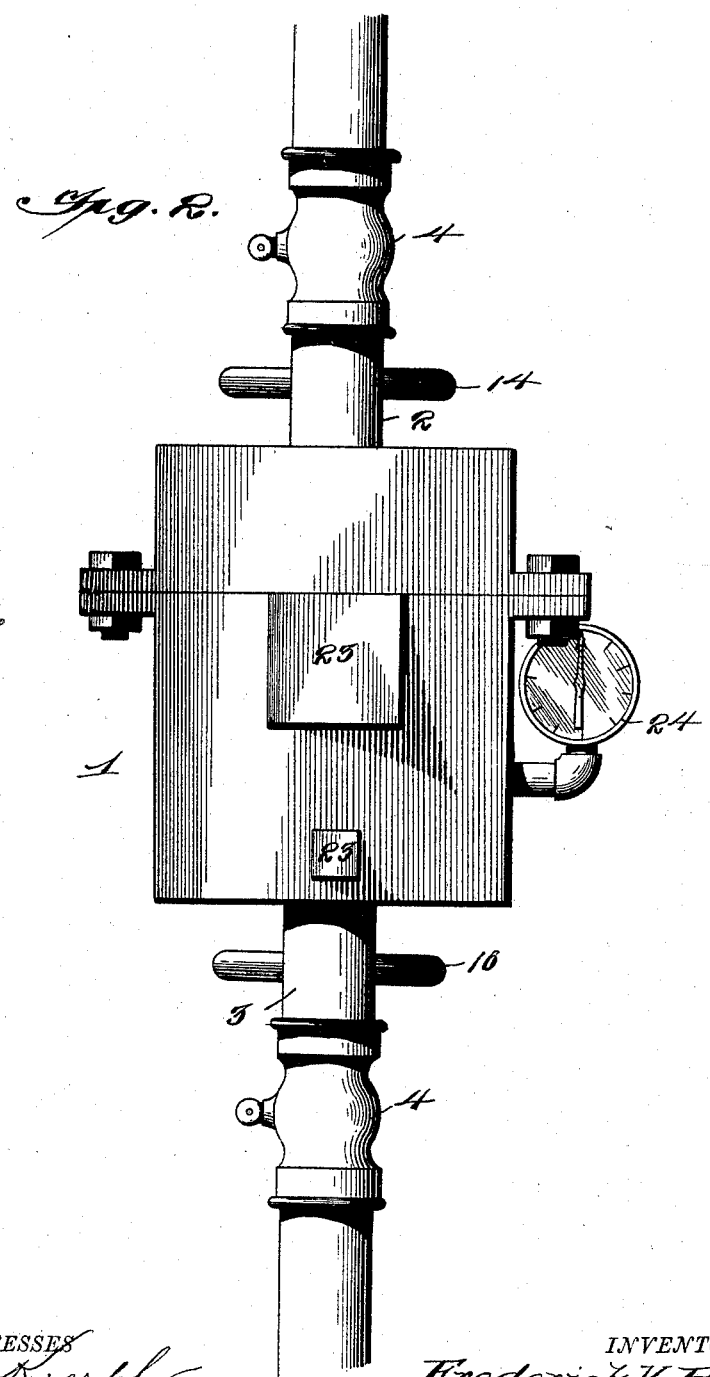
WITNESSES
INVENTOR
Frederick V. Barker,
by John Wedderburn
Attorney (No Model.) 4 Sheets—Sheet 3.

F. V. BARKER.
FLUID PRESSURE REGULATOR.

No. 584,766. Patented June 22, 1897.

WITNESSES
INVENTOR
Frederick V. Barker,
by John Wedderburn
Attorney

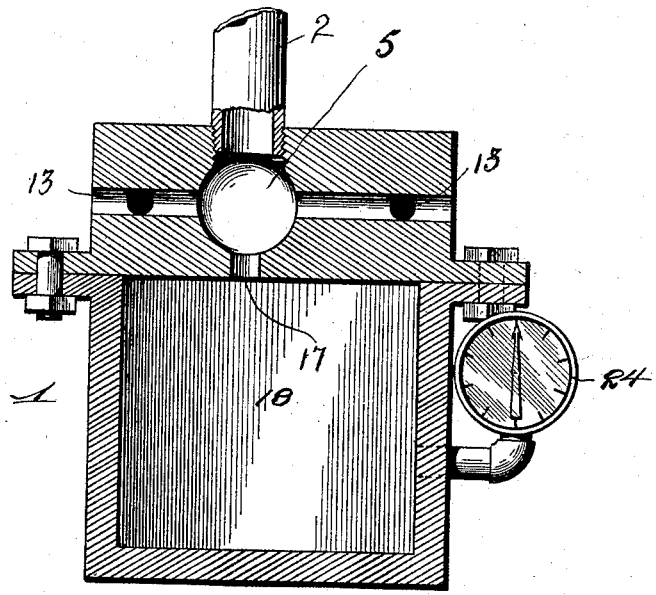

UNITED STATES PATENT OFFICE.

FREDERICK V. BARKER, OF ATHENS, MAINE.

FLUID-PRESSURE REGULATOR.

SPECIFICATION forming part of Letters Patent No. 584,766, dated June 22, 1897.

Application filed December 12, 1896. Serial No. 615,494. (No model.)

*To all whom it may concern:*

Be it known that I, FREDERICK V. BARKER, a citizen of the United States, residing at Athens, in the county of Somerset and State of Maine, have invented certain new and useful Improvements in Pressure-Regulators; and I do hereby declare the following to be a full, clear, and exact description of the invention, such as will enable others skilled in the art to which it appertains to make and use the same.

My invention relates to pressure-regulators; and its object is to provide a valve to which steam, air under pressure, gas, or the like may be admitted at variable pressures and from which it can pass at a uniform pressure.

My invention consists of a valve having an automatic throttling cut-off, the novel features of construction of which are shown in the drawings and hereinafter fully described and claimed.

In the accompanying drawings, Figure 1 is a side elevation of my device. Fig. 2 is an end elevation of the same. Fig. 3 is a section on the line $x\,x$ of Fig. 1, and Fig. 4 is a section on the line $y\,y$ of Fig. 1.

The numeral 1 designates the body of my valve, to which air is supplied from any desired source through the pipe 2 and from which the air can be drawn for any purpose through the pipe 3. A stop-cock 4 is provided in each of these pipes. Within the body 1 is formed a chamber 5, extending longitudinally therein. A passage 6 affords communication between the pipe 2 and this chamber, and a similar passage 7 admits of the passage of the air therefrom to the pipe 3. Within this chamber is located a series of pistons 8, 9, and 10, firmly fixed upon a rod or stem 11. These pistons closely engage the sides of the chamber and divide it into several portions. The piston 8 is located between the main portion of the chamber and what I prefer to call my "regulating-chamber" 12. This chamber 12 communicates with the passage 6 by means of a passage 13, and the admission of air therethrough is controlled by a valve 14. Air may be drawn off from this chamber by means of a passage 15, and the egress is controlled by a valve 16. The passage 15 opens through the exterior wall of my valve and communicates with the outside air. A passage 17 leads from the chamber 12 to what I term an "air-spring" chamber 18, the purpose of which will hereinafter fully appear. The piston 9 is so located that it is adapted to project over the end of the passage 7 and wholly or partially close communication between the said passage and the chamber 5. Behind this piston is a third piston 10, adapted to project over the end of the auxiliary chamber 20 an equal amount with the projection of the piston 9 over the end of the passage 7. A passage 22 affords communication between the passage 7 and that portion of the air-chamber designated by the numeral 19. It is usual to construct these passages in this type of valve by boring them to size, and I therefore show the ordinary means of closure for such passages, which I indicate by the numerals 23. A gage of any preferred form communicates with the air-spring chamber 18 and is indicated by the numeral 24.

In order to explain the operation of my device, we will assume that it is desired to maintain a constant pressure of fifty pounds to the square inch to operate a motor connected to the pipe 3, and that communicating with the pipe 2 is a reservoir containing air at a pressure of five hundred pounds. It will be apparent that if air be drawn from the reservoir the pressure therein will constantly decrease and that at all times we would have a varying pressure, so that it would be impossible to maintain equal speed upon the motor under the same load. By means of my valve I maintain this constant pressure in the following manner: The stop-cock in the pipe 3 is closed, as are also valves 14 and 16. The stop-cock in the pipe 2 is now opened, thus admitting the full pressure of five hundred pounds into the passage 6, the chamber 5, the passage 7, and the smaller passages 22 and 13, and the portion 19 of the chamber 5. It will be observed that by the admission of air under this pressure to the back of the piston 9 the said piston will be balanced and will be readily capable of movement in either direction. It will also be observed that the pressure on the side of the piston 8 toward the main portion of the chamber will exceed that on the side of said piston toward the portion 12. This will cause the piston 8 to move toward the chamber 12 and will thus move the piston 9 over the edge of the upper end of the passage 7, in this manner throttling the admission of air into said passage 7. If now the valve 14 be opened, the pressure in the passage 13, acting on the back of the piston 8, will tend to open the passage 7. It is evident that when this passage is partially closed the pressure on the back of the piston 9 will be somewhat reduced and the passage will tend to open. By means of the gage in the air-spring chamber the pressure within the chamber 12 may be accurately adjusted by shutting the valve 14 when the pressure has reached the proper point, say of fifty pounds. The stop-cock in the passage 3 is now opened. When this is done, since the air will find a free vent through the passage 3, the pressure within the passage 22, and consequently within the chamber 19, will be reduced to the same pressure as acts upon the back of the piston 8, or fifty pounds. The whole system of pistons will thus be held in equilibrium and any increase of pressure over fifty pounds within the passage 3, and consequently within the passage 22 and chamber 19, will act upon the back of the piston 9 and shut off the supply of air. Further, any decrease will admit a further supply of air by opening the upper end of the passage 7. It will be plain from this that a constant pressure within the pipe 3 will be maintained and that this pressure will at all times be equal to that indicated upon the gage 24; and at any time the pressure may be increased by opening the valve 14 without touching either stop-cock, and in like manner it may be decreased by opening the valve 16, which will permit of the passage of the air contained in the air-spring chamber into the open air.

The purpose of the auxiliary chamber 20 will now be explained. When the piston 9 projects over the end of the passage 7, there is a pressure upon the end of the side thereof, which tends to lift the piston and cause it to bind upon the upper side of the chamber 5. To counteract this, when the piston 10 projects across the end of the auxiliary chamber 20 a like pressure is exerted upon the upper portion thereof and the valve is kept in perfect balance, thus permitting an easy movement with little friction.

It is obvious that many slight changes may be made in the form and construction of my device without in any way affecting the principle involved, and I do not, therefore, desire to confine myself to the precise construction herein shown and described.

From the foregoing it will be plain that I provide a device of the character described which will greatly regulate the pressure and permit of the adjustment of the same while in operation by the turning of a single valve. I thus offer an extremely simple and efficient pressure-regulator.

Having thus described my invention, what I claim as new, and desire to secure by Letters Patent, is—

1. In a pressure-regulating valve, the combination with a casing having a chamber provided with ingress and egress passages, of a series of diaphragms dividing said chamber into separate portions, a valve-controlled conduit leading from the ingress-passage to one of said portions, and a valve-controlled conduit leading from said portion to the exterior of the casing.

2. In a pressure-regulating valve, the combination with a casing having a chamber provided with ingress and egress passages, of a series of diaphragms held to slide within said chamber and dividing it into several portions, a valve-controlled conduit leading from the ingress-opening to one of said portions, a similar conduit leading from that portion to the exterior of the casing, and an open conduit leading from the egress-opening to a second portion of said chamber.

3. In a pressure-regulating valve, the combination with a casing having a chamber provided with ingress and egress passages leading therefrom, of two rigidly-connected diaphragms dividing the chamber into a central portion, into which the ingress-passage leads and from which the egress-passage leads, a valve-controlled conduit affording communication between the ingress-passage and one end portion of the chamber, a valve-controlled conduit affording communication between said end portion and the exterior of the valve, and an open conduit affording communication between the egress-passage and the second end portion of the chamber.

4. In a pressure-regulating valve, the combination with a casing having a chamber provided with ingress and egress passages, of two rigidly-connected diaphragms dividing said chamber into a middle portion into which said ingress and egress passages open, and two end portions, a valve-controlled conduit leading from the ingress-passage to one of said end portions, a similar conduit leading from the same portion to the exterior of the casing, an open conduit leading from the egress-passage to the second end portion of the chamber, and a third diaphragm having perforations therein rigidly connected to the aforementioned diaphragms.

5. In a pressure-regulating valve, the combination with a casing having a chamber provided with ingress and egress passages, of two rigidly-connected diaphragms held to slide within said opening and dividing the same into a middle portion communicating with the ingress and egress passages, and two end portions, a valve-controlled conduit leading from the ingress-passage to one of said end portions, a similar conduit leading from the same portion to the exterior of the casing, an enlarged chamber communicating with said end portion, an open conduit leading from the egress-passage to the second end portion, and a third diaphragm, having perforations therein, rigidly connected to the aforementioned diaphragms and held to slide within said second portion of the chamber.

6. In a pressure-regulating valve, the combination with a casing having a chamber provided with ingress and egress passages, of two rigidly-connected diaphragms held to slide within said opening and dividing it into a central portion into which the ingress and egress passages open, and two end portions, one of which is enlarged, a valve-controlled conduit leading from the ingress-passage to one of said end portions, a similar conduit leading from said end portion out of the casing, an enlarged chamber communicating with said end portion, a pressure-gage communicating with said chamber, an open conduit leading from the egress-passage to the second portion having an enlargement therein, a third diaphragm provided with perforations therethrough, rigidly connected to the aforesaid diaphragm and held to slide within the body of said end portion, and valves to control the ingress and egress passages.

7. In a pressure-regulating valve, the combination with a casing having an approximately central chamber and provided with ingress and egress passages, of two rigidly-connected diaphragms held to slide within said chamber and dividing it into a central portion into which the ingress and egress passages open and two end portions, one of which is enlarged, a valve-controlled conduit leading from the ingress-passage to one of said end portions, a similar conduit leading from said end portion out of the casing, an enlarged chamber communicating with said end portion, a pressure-gage communicating with said chamber, an open conduit leading from the egress-passage to the enlarged chamber, a third diaphragm, provided with perforations therethrough, said diaphragm being so connected as to project an equal amount across the end of the enlarged portion of the chamber as one of the aforementioned diaphragms projects across the egress-opening, and valves in the ingress and egress openings.

In testimony whereof I have signed this specification in the presence of two subscribing witnesses.

FREDERICK V. BARKER.

Witnesses:
J. F. HOLMAN,
B. T. FOX.